US008428020B2

(12) United States Patent
Cai et al.

(10) Patent No.: US 8,428,020 B2
(45) Date of Patent: Apr. 23, 2013

(54) INDICATION OF UPLINK SEMI-PERSISTENT SCHEDULING EXPLICIT RELEASE USING A DOWNLINK PHYSICAL DOWNLINK CONTROL CHANNEL

(75) Inventors: Zhijun Cai, Irving, TX (US); Yi Yu, Irving, TX (US); Richard Charles Burbidge, Slough (GB)

(73) Assignee: Research In Motion Limited, Waterlooo, Ontario (CA)

( * ) Notice: Subject to any disclaimer, the term of this patent is extended or adjusted under 35 U.S.C. 154(b) by 394 days.

(21) Appl. No.: 12/698,831

(22) Filed: Feb. 2, 2010

(65) Prior Publication Data

US 2010/0202389 A1 Aug. 12, 2010

Related U.S. Application Data

(60) Provisional application No. 61/149,060, filed on Feb. 2, 2009.

(51) Int. Cl.
*H04W 4/00* (2009.01)
(52) U.S. Cl.
USPC .......................................................... 370/329
(58) Field of Classification Search .................. 370/329, 370/328, 352, 230, 216, 236, 310.2; 455/450, 455/452.1; 714/748
See application file for complete search history.

(56) References Cited

U.S. PATENT DOCUMENTS

| 2009/0088148 | A1 | 4/2009 | Chung et al. |
| 2010/0027446 | A1 | 2/2010 | Choi et al. |

FOREIGN PATENT DOCUMENTS

| DE | EP 2166804 | * | 9/2008 |
| JP | 2008510380 A | | 4/2008 |
| JP | 2011259440 A | | 12/2011 |
| WO | 2006020520 A2 | | 2/2006 |
| WO | 2008037357 A1 | | 4/2008 |
| WO | 2008127015 A1 | | 10/2008 |
| WO | 2010031470 A1 | | 3/2010 |

OTHER PUBLICATIONS

Australian Office Action; Application No. 2009324573; Jul. 19, 2011; 2 pages.
Yu, Yi., et al.; U.S. Appl. No. 12/635,365, filed Dec. 10, 2009; Title: Uplink Semi-Persistent Scheduling Explicit Release Acknowledgement Transmission.
3GPP TS 36.211 v8.4.0; 3rd Generation Partnership Project; Technical Specification Group Radio Access Network; Evolved Universal Terrestrial Radio Access (E-UTRA); Physical Channels and Modulation; Release 8; Sep. 2008; 78 pgs.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pgs.

(Continued)

*Primary Examiner* — Chi Pham
*Assistant Examiner* — Alexander O Boakye
(74) *Attorney, Agent, or Firm* — Conley Rose, P.C.; J. Robert Brown, Jr.

(57) ABSTRACT

A method is provided for acknowledging a semi-persistent scheduling (SPS) uplink resource release. The method comprises receiving an SPS resource release signal over a physical downlink control channel in a Downlink Control Information (DCI) format 1A. The signal includes an indicator that indicates that the signal pertains to at least one of an uplink resource release and a downlink resource release. The method further comprises sending an acknowledgement to confirm the release of the resource.

21 Claims, 4 Drawing Sheets

OTHER PUBLICATIONS

3GPP TS 36.213 v8.4.0; 3rd Generation Partnership Project; Technical Specification Group Radio Access Network; Evolved Universal Terrestrial Radio Access (E-UTRA); Physical Layer Procedures; Release 8; Sep. 2008; 60 pgs.

3GPP TS 36.321 v8.3.0; 3rd Generation Partnership Project; Technical Specification Group Radio Access Network; Evolved Universal Terrestrial Radio Access (E-UTRA) Medium Access Control (MAC) Protocol Specification; Release 8; Sep. 2008; 36 pgs.

3GPP TSG-RAN WG2 Meeting #63bis; 6.1.1.8; Missing Details of Semi-persistent Scheduling for UL; Discussion and Decision; Nokia Corporation, Nokia Siemens Networks; R2-085070; Sep. 29-Oct. 3, 2008; 3 pgs.

3GPP TSG-RAN2#63 Meeting; 6.1.1.3; SPS Resourse Release; Discussion and Decision; Samsung; R2-084455; Aug. 18-22, 2008; 1 pg.

3GPP TSG RAN WG1 Meeting #53bis; 6.1; Views on US ACK/NAK Repetition Details; Discussion and Decision; NTT DoCoMo; R1-082571; Jun. 30-Jul. 4, 2008; 5 pgs.

TSG-RAN WG2 Meeting # 60bis; 4.3.3; Configuration of Semi-persistent Scheduling; Discussion and Decision; Ericsson; R2-080088; Jan. 14-18, 2008; 2 pgs.

Dajie, Jiang, et al; Principles and Performance of Semi-persistent Scheduling for VoIP in LTE System; Sep. 21, 2007; 4 pgs.

PCT International Search Report; PCT Application No. PCT/US2009/067520; Apr. 1, 2010; 3 pgs.

PCT Written Opinion of the International Searching Authority; PCT Application No. PCT/US2009/067520; Apr. 1, 2010; 5 pgs.

3GPP TSG RAN WG2 Meeting #63; 6.1.1.3; Resource Allocation Signalling for SPS; Discussion and Decision; Phillips, NXP Semiconductors; Jeju, Korea; Tdoc R2-084087; Aug. 18-22, 2008; 2 pgs.

3GPP TSG-RAN Meeting #55bis; PDCCH Validation for Semi-Persistent Scheduling Release; RIM; Ljubljana, Slovenia; R1-090024; Jan. 12-16, 2009; 3 pgs.

3GPP TSG-RAN WG2 #64bis; ACK for UL SPS Explicit Release; Research in Motion; Ljubljana, Slovenia; R2-090368; Jan. 12-16, 2009; 2 pgs.

PCT International Search Report; PCT Application No. PCT/US2010/022914; May 25, 2010; 3 pgs.

PCT Written Opinion of the International Searching Authority; PCT Application No. PCT/US2010/022914; May 25, 2010; 7 pgs.

Office Action dated Dec. 30, 2011; U.S. Appl. No. 12/635,365, filed Dec. 10, 2009; 25 pages.

PCT International Preliminary Report on Patentability; PCT Application No. PCT/US2009/067520; Jun. 14, 2011; 6 pgs.

PCT International Preliminary Report on Patentability; PCT Application No. PCT/US2010/022914; May 9, 2011; 12 pgs.

Office Action dated Jul. 12, 2012; U.S. Appl. No. 12/635,365, filed Dec. 10, 2009; 9 pages.

Korean Office Action; Application No. 10-2011-7015892; Aug. 14, 2012; 6 pages.

Australian Office Action; Application No. 2009324573; May 8, 2012; 2 pages.

Japanese Office Action; Application No. 2011-548407; Oct. 26, 2012; 9 pages.

Japanese Office Action; Application No. 2011-540898; Jan. 25, 2013; 7 pages.

Final Office Action dated Feb. 22, 2013; U.S. Appl. No. 12/635,365 filed Dec. 10, 2009; 22 pages.

\* cited by examiner

|  | DCI format 0 | DCI format 1/1A | DCI format 2/2A |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 1

|  | DCI format 1A |
|---|---|
| Localized/Distributed Assignment Flag | DL: set to '0' UL: set to '1' |
| HARQ process number | FDD: set to '000' TDD: set to '0000' |
| Modulation and coding scheme | set to '11111' |
| Redundancy version | set to '00' |
| Resource block assignment | Set to all '1's |

Table 2

| Value of 'TPC command for PUCCH' | $n^{(1)}_{PUCCH}$ |
|---|---|
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

Table 3

Figure 3

INDICATION OF UPLINK SEMI-PERSISTENT SCHEDULING EXPLICIT RELEASE USING A DOWNLINK PHYSICAL DOWNLINK CONTROL CHANNEL

CROSS-REFERENCE TO RELATED APPLICATIONS

The present application claims priority to U.S. Provisional Patent Application No. 61/149,060, filed Feb. 2, 2009, by Zhijun Cai, et al, entitled "Indication of Uplink Semi-Persistent Scheduling Explicit Release Using a Downlink Physical Downlink Control Channel", which is incorporated by reference herein as if reproduced in its entirety.

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network nodes. When a UE is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UE, where the remote UE represents the wireless device in the network. The term "UE" can also refer to any hardware or software component that can terminate a SIP session.

In traditional wireless telecommunications systems, transmission equipment in a base station transmits signals throughout a geographical region known as a cell. As technology has evolved, more advanced network access device has been introduced that can provide services that were not possible previously. This advanced network access device might include, for example, an enhanced node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station, an LTE eNB, or any other system or device, that can provide a UE with access to other components in a telecommunications system.

For packet data, the signal that carries data between a UE and an access device can have a specific set of frequency, time, and coding parameters and other characteristics that might be specified by the access device. A connection between a UE and an access device that has a specific set of such characteristics can be referred to as a resource. An access device typically establishes a different resource for each UE with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 contains tables related to embodiments of the disclosure.

DETAILED DESCRIPTION

Figure 1:
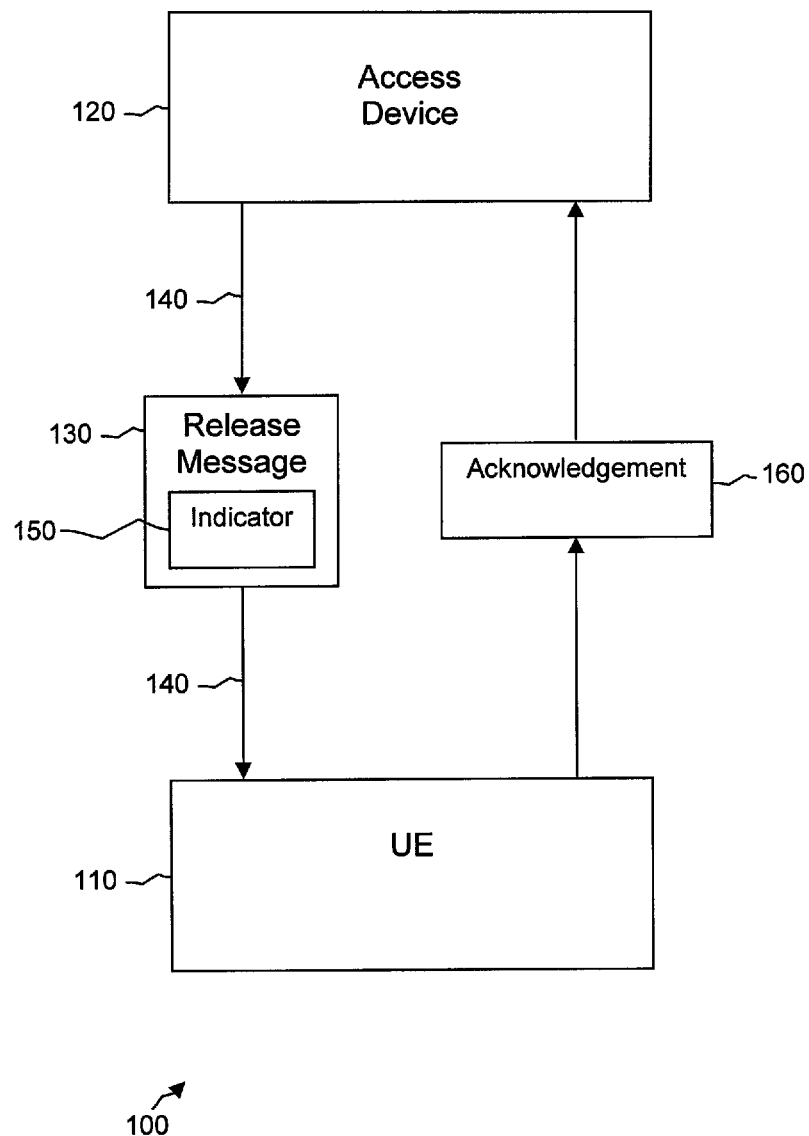
FIG. 1 is a diagram of an embodiment of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a procedure known as uplink semi-persistent scheduling (SPS), a UE sends an access device a single scheduling request and/or buffer status report specifying the characteristics of the data packets that the UE wishes to send to the access device. The access device then grants the UE an uplink resource with appropriate characteristics for transmitting the UE's data packets to the access device. Based on the single request, the access device thereafter periodically grants the UE substantially the same resource for subsequent, periodic transmissions of the data packets. A similar procedure might be used on the downlink.

When a UE and an access device are communicating using SPS, the access device might instruct the UE to stop sending data to the access device on the uplink SPS resource that has been periodically allocated, and the resource is released. Such an instruction can be referred to as an uplink SPS resource release message or an uplink SPS resource release signal. The access device might also notify the UE that the access device will no longer periodically allocate downlink SPS resources to the UE. Such a notification can be referred to as a downlink SPS resource release message or a downlink SPS resource release signal.

The access device can send the UE uplink and downlink SPS resource release signals over a physical downlink control channel (PDCCH). The signals can use the downlink control information (DCI) format. A DCI format 0 is traditionally used for uplink SPS resource release messages, and a DCI format 1A is traditionally used for downlink SPS resource release messages. That is, when the UE receives a release signal in the DCI format 0, the UE knows that the release signal pertains to an uplink SPS resource release, and when the UE receives a release signal in the DCI format 1A, the UE knows that the release signal pertains to a downlink SPS resource release.

After receiving a DCI format 1A downlink SPS resource release signal, the UE can confirm the release of the downlink resource by returning a hybrid automatic repeat request acknowledgement (HARQ ACK) to the access device using a pre-determined uplink resource derived from the received DCI format 1A message. However, DCI format 0 does not include such a mechanism to allow the UE to return an acknowledgement (ACK) to the access device after receiving a DCI format 0 uplink SPS resource release signal. That is, the UE may not be able to determine the uplink resource to transmit the HARQ ACK to the access device. The access device may therefore be unaware of whether the UE received the uplink SPS resource release signal.

Disclosed herein are a system and method to provide a UE with a capability to acknowledge an uplink SPS resource release signal. In an embodiment, an access device uses the DCI format 1A instead of the DCI format 0 over the PDCCH to transmit an uplink SPS uplink resource release signal. That is, instead of DCI format 1A being used exclusively for downlink SPS resource release signals, DCI format 1A is also used for uplink SPS resource release signals. The UE can then acknowledge uplink SPS resource release signals using the existing HARQ ACK mechanism that is available for acknowledging downlink SPS resource release signals based on the DCI format 1A.

Since DCI format 1A is used in these embodiments for both uplink SPS resource release signals and downlink SPS resource release signals, a resource release signal from an access device to a UE needs to indicate whether the resource release signal pertains to an uplink release or a downlink release or both. In an embodiment, indicators can be placed in unused data fields in a DCI format 1A signal to indicate whether the signal is an uplink SPS resource release signal or a downlink SPS resource release signal or both.

When an access device sends an SPS resource release message to a UE, several data fields that are used in other types of messages may not be used. For example, resource assignment information and modulation and coding information might be included in many of the messages that the access device sends to the UE, and specific fields in the messages may be reserved for this information. Such information may not be needed in a release message, and the fields for such information may traditionally be left unused in a DCI format 1A release message. In an embodiment, these unused fields can be used to include indicators of whether a DCI format 1A release message pertains to an uplink release or a downlink release or both.

More specifically, the "Localized/Distributed Assignment Flag" field and/or the "TPC Command for PUCCH" field of a DCI format 1A release message could include indicators to indicate whether the message is an uplink SPS resource release message or a downlink SPS resource release message. In an embodiment, when the "Localized/Distributed Assignment Flag" field is used, a value of "0" in the field could indicate a downlink SPS resource release, and a value of "1" in the field could indicate an uplink SPS resource release. Alternatively, other values could be used for these indications. For example, a value of "1" in the field could indicate a downlink SPS resource release, and a value of "0" in the field could indicate an uplink SPS resource release. In an embodiment, when the "TPC Command for PUCCH" field is used, a value of "00" in the field could indicate a downlink SPS resource release, and a value of "11" in the field could indicate an uplink SPS resource release. Alternatively, other values could be used for these indications. In another embodiment, a specific value could be used to indicate to release both the uplink SPS resource and the downlink SPS resource. For example, a value of "01" for the "TPC Command for PUCCH" field could be used to indicate to release both the uplink SPS resource and the downlink SPS resource.

FIG. 1 illustrates an embodiment of a wireless communication system 100, for instance as described in the Third Generation Partnership Project (3GPP). FIG. 1 is exemplary and may have other components or arrangements in other embodiments. The wireless communication system 100 may comprise at least one UE 110 and at least one access device 120. The UE 110 may wirelessly communicate, via a wireless link, with the network access device 120. The wireless link may conform to any of a plurality of telecommunications standards or initiatives, such as those described in the 3GPP, including LTE, GSM, GPRS/EDGE, High Speed Packet Access (HSPA), and Universal Mobile Telecommunications System (UMTS). Additionally or alternatively, the wireless link may conform to any of a plurality of standards described in the 3GPP2, including Interim Standard 95 (IS-95), Code Division Multiple Access (CDMA) 2000 standards 1xRTT or 1xEV-DO. The wireless link may also be compatible with other standards, such as those described by the Institute of Electrical and Electronics Engineers (IEEE), or other industry forums, such as the WiMAX forum.

The access device 120 may be an eNB, a base station, or other components that promote network access for the UE 110. The access device 120 may communicate with the UE 110 directly via a direct link. For instance, the direct link may be a point-to-point link established between the access device 120 and the UE 110 and may be used to transmit and receive signals between the two. Additionally, the access device 120 may also communicate with other components or devices to provide the components of the wireless communication system 100 access to other networks.

The UE 110 and the access device 120 may wirelessly communicate via at least one downlink (DL) channel, at least one uplink (UL) channel, or both. The downlink and uplink channels may be physical channels, which may be statically, semi-statically, semi-persistently, or dynamically allocated network resources. For instance, the downlink and uplink channels may comprise at least one physical downlink shared channel (PDSCH), at least one physical downlink control channel (PDCCH), at least one physical uplink shared channel (PUSCH), at least one physical uplink control channel (PUCCH), or combinations thereof. The downlink and uplink channels may be established using frequency-division duplexing (FDD), where signals are received and transmitted at different frequencies. Additionally or alternatively, the downlink and uplink channels may be established using time-division, where the signals may be transmitted, received, or both at different transmission time intervals (TTIs).

In an embodiment, the UE 110 may receive from the access device 120 an SPS resource release message 130 in the DCI format 1A for an uplink over a PDCCH 140. The message 130 may include an indicator 150 that indicates that the message 130 pertains to an uplink resource release. The UE 110 may then acknowledge receiving the uplink resource release message 130 by transmitting an acknowledgement 160 to the access device 120. The acknowledgement 160 may take the form of a HARQ ACK message that has traditionally been available for messages that use the DCI format 1A.

Figure 2:
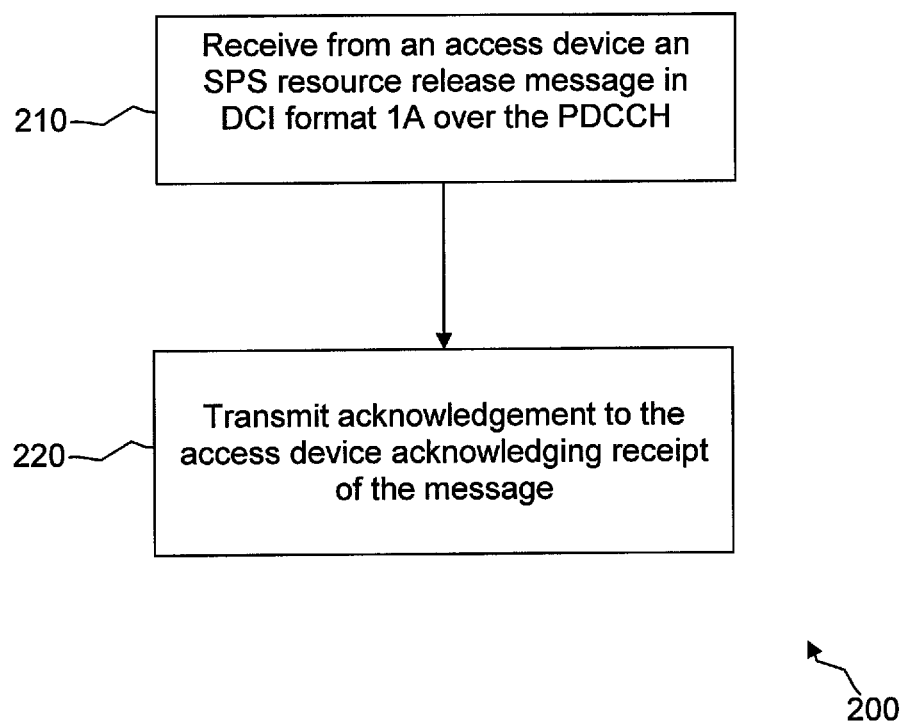
FIG. 2 is a flowchart of a method for acknowledging a semi-persistent scheduling resource release according to an embodiment of the disclosure.

FIG. 2 illustrates an embodiment of a method 200 for acknowledging an SPS resource release. At block 210, the UE 110 receives from the access device 120 an SPS resource release message in the DCI format 1A over the PDCCH. The message includes an indicator that indicates whether the message pertains to an uplink resource release or a downlink resource release or both. At block 220, the UE 110 transmits an acknowledgement to the access device 120 acknowledging receipt of the message.

In an alternative embodiment, a UE validates a Semi-Persistent Scheduling assignment PDCCH only if the CRC parity bits obtained for the PDCCH payload are scrambled with the Semi-Persistent Scheduling C-RNTI and the new data indicator field, in case of DCI formats 2 and 2A for the enabled transport block, is set to '0'. Validation is achieved if all the fields for the respective used DCI format are set according to Table 1 or Table 2 of FIG. 3. If validation is achieved, the UE considers the received DCI information accordingly as a valid semi-persistent activation or release. If validation is not achieved, the received DCI format is considered by the UE as having been received with a non-matching CRC. For the case that the DCI format indicates a semi-persistent downlink scheduling activation, the TPC command for PUCCH field is used as an index to one of the four PUCCH resource indices configured by higher layers, with the mapping defined in Table 3 of FIG. 3.

Figure 4:
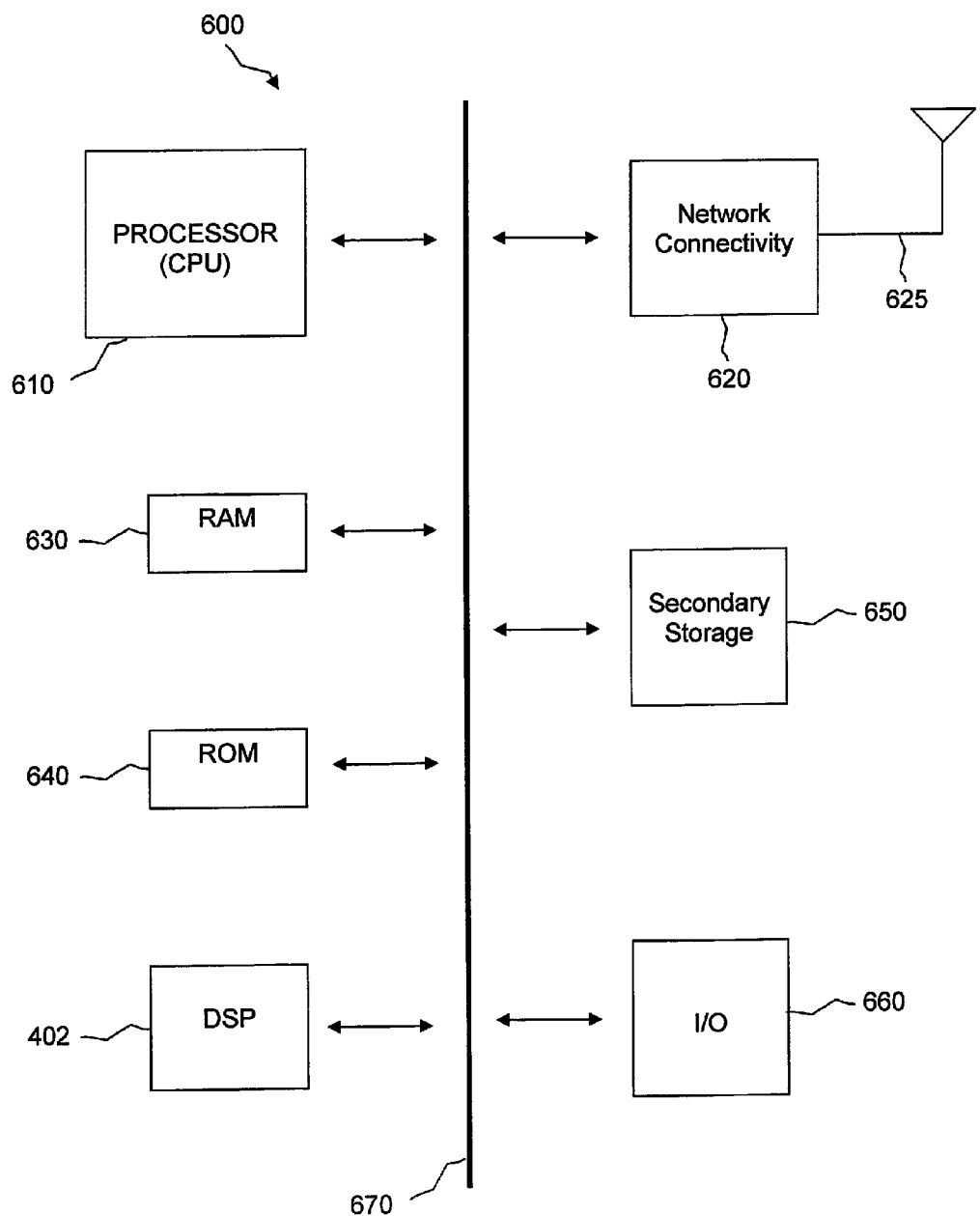
FIG. 4 illustrates a processor and related components suitable for implementing the several embodiments of the present disclosure.

The UE 110 and other components described above might include a processing component that is capable of executing instructions related to the actions described above. FIG. 4 illustrates an example of a system 600 that includes a processing component 610 suitable for implementing one or more embodiments disclosed herein. In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 670. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a DSP 402. Although the DSP 402 is shown as a separate component, the DSP 402 might be incorporated into the processor 610.

The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), touch screen displays, keyboards, keypads, switches, dials, mice, track balls, voice recognizers, card readers, paper tape readers, printers, video monitors, or other well-known input or output devices. Also, the transceiver 625 might be considered to be a component of the I/O devices 660 instead of or in addition to being a component of the network connectivity devices 620.

The following are incorporated herein by reference for all purposes: 3GPP TS 36.212, 3GPP TS 36.213, and 3GPP TS 36.321.

In an embodiment, a method is provided for acknowledging an SPS resource release. The method includes receiving an SPS resource release signal over a physical downlink control channel in a Downlink Control Information (DCI) format 1A. The signal includes an indicator that indicates that the signal pertains to at least one of an uplink resource release and a downlink resource release. The method further includes sending an acknowledgement to confirm the release of the resource.

In another embodiment, a UE is provided. The UE includes a processor configured to receive an SPS resource release signal over a physical downlink control channel in a Downlink Control Information (DCI) format 1A. The signal includes an indicator that indicates that the signal pertains to at least one of an uplink resource release and a downlink resource release.

In another embodiment, an access device is provided. The access device includes a processor configured to transmit an uplink SPS resource release message over a physical downlink control channel in a Downlink Control Information (DCI) format 1A.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for acknowledging a semi-persistent scheduling (SPS) resource release, comprising:
   receiving an SPS resource release signal over a physical downlink control channel in a Downlink Control Information (DCI) format 1A, the signal including an indicator that indicates that the signal pertains to at least one of an uplink resource release and a downlink resource release,
   wherein the indicator is included in a data field in the signal, and
   wherein the data field is at least one of:
      a Localized/Distributed Assignment Flag field; and
      a 'TPC Command for PUCCH' field.

2. The method of claim 1, further comprising:
   sending an acknowledgement to confirm receipt of the signal.

3. The method of claim 1, wherein, when the data field is the Localized/Distributed Assignment Flag field, the indicator is set to "0" to indicate the downlink resource release, and the indicator is set to "1" to indicate the uplink resource release.

4. The method of claim 1, wherein, when the data field is the Localized/Distributed Assignment Flag field, the indicator is set to "1" to indicate the downlink resource release, and the indicator is set to "0" to indicate the uplink resource release.

5. The method of claim 1, wherein, when the data field is the 'TPC Command for PUCCH' field, the indicator is set to "00" to indicate the downlink resource release, and the indicator is set to "11" to indicate the uplink resource release.

6. The method of claim 1, wherein, when the data field is the 'TPC Command for PUCCH' field, the indicator is set to "11" to indicate the downlink resource release, and the indicator is set to "00" to indicate the uplink resource release.

7. The method of claim 1, wherein, when the data field is the 'TPC Command for PUCCH' field, the indicator indicates both downlink resource release and uplink resource release.

8. A user equipment (UE) comprising:
   a processor configured to receive an SPS resource release signal over a physical downlink control channel in a Downlink Control Information (DCI) format 1A, the signal including an indicator that indicates that the signal pertains to at least one of an uplink resource release and a downlink resource release,
   wherein the indicator is included in a data field in the signal, and
   wherein the data field is at least one of:
      a Localized/Distributed Assignment Flag field; and
      a 'TPC Command for PUCCH' field.

9. The UE of claim 8, wherein, when the data field is the Localized/Distributed Assignment Flag field, the indicator is set to "0" to indicate the downlink resource release, and the indicator is set to "1" to indicate the uplink resource release.

10. The UE of claim 8, wherein, when the data field is the Localized/Distributed Assignment Flag field, the indicator is set to "1" to indicate the downlink resource release, and the indicator is set to "0" to indicate the uplink resource release.

11. The UE of claim 8, wherein, when the data field is the 'TPC Command for PUCCH' field, the indicator is set to "00" to indicate the downlink resource release, and the indicator is set to "11" to indicate the uplink resource release.

12. The UE of claim 8, wherein, when the data field is the 'TPC Command for PUCCH' field, the indicator is set to "11" to indicate the downlink resource release, and the indicator is set to "00" to indicate the uplink resource release.

13. The UE of claim 8, wherein, when the data field is the 'TPC Command for PUCCH' field, the indicator indicates both downlink resource release and uplink resource release.

14. The UE of claim 8, wherein the processor is further configured to send an acknowledgement confirming receipt of the signal.

15. An access device comprising:
   a processor configured to transmit an uplink SPS resource release message over a physical downlink control channel in a Downlink Control Information (DCI) format 1A,
   wherein the message includes an indicator that indicates that the message pertains to an uplink resource release,
   wherein the indicator is included in a data field in the resource release message, and
   wherein the data field is at least one of:
      a Localized/Distributed Assignment Flag field; and
      a 'TPC Command for PUCCH' field.

16. The access device of claim 15, wherein the processor is further configured to receive an acknowledgement confirming receipt of the resource release message.

17. The access device of claim 15, wherein, when the data field is the Localized/Distributed Assignment Flag field, the indicator is set to "0" to indicate a downlink resource release, and the indicator is set to "1" to indicate the uplink resource release.

18. The access device of claim 15, wherein, when the data field is the Localized/Distributed Assignment Flag field, the indicator is set to "1" to indicate a downlink resource release, and the indicator is set to "0" to indicate the uplink resource release.

19. The access device of claim 15, wherein, when the data field is the 'TPC Command for PUCCH' field, the indicator is set to "00" to indicate a downlink resource release, and the indicator is set to "11" to indicate the uplink resource release.

20. The access device of claim 15, wherein, when the data field is the 'TPC Command for PUCCH' field, the indicator is set to "11" to indicate a downlink resource release, and the indicator is set to "00" to indicate the uplink resource release.

21. The access device of claim 15, wherein, when the data field is the 'TPC Command for PUCCH' field, the indicator indicates both downlink resource release and uplink resource release.

* * * * *